(Model.)
J. T. STOLL.
Horse Collar Pad.
No. 236,857. Patented Jan. 18, 1881.
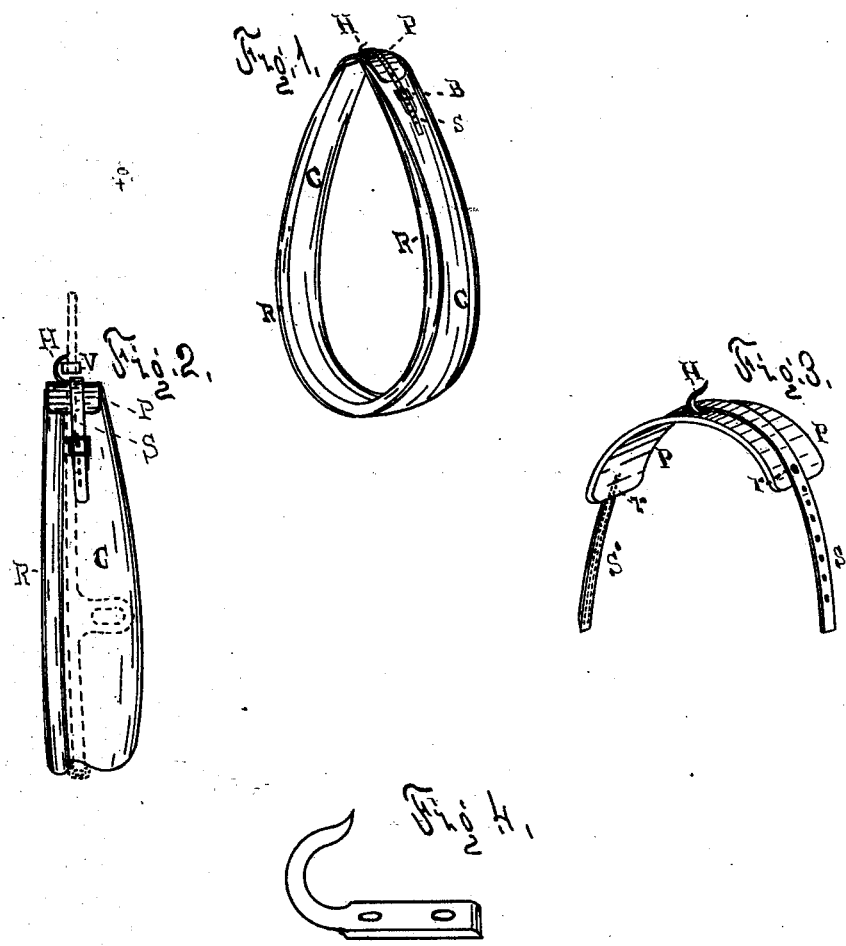

UNITED STATES PATENT OFFICE.

JOHN T. STOLL, OF SACRAMENTO, CALIFORNIA.

HORSE-COLLAR PAD.

SPECIFICATION forming part of Letters Patent No. 236,857, dated January 18, 1881.

Application filed December 17, 1880. (Model.)

*To all whom it may concern:*

Be it known that I, JOHN T. STOLL, of the city of Sacramento, State of California, have invented a new and useful Improvement in Horse-Collar Pads, of which the following is a specification.

The invention relates to that class of harness-collars which are made to open at the top when they are put on or taken off of the horse or animal.

The advantages of the open-top collar over those that are made solid are, that they are more easily put on or taken off, and as they are strapped together at the top they can be tightened so as to fit different animals, or to fit an animal while either in a fat or lean condition.

Heretofore such collars have been constructed so as to be held together at the top by means of straps and buckles drawn over the top of the collar, which is objectionable, owing to the flexibility and stretch of the straps, allowing the collar to twist and change form, and also in the fact that the strain put upon the hame-strap causes it to press down in the collar and hurt the animal's neck; and, secondly, the hames that are worn outside of the collar are kept in position by being tightly strapped around the collar, which is objectionable, owing to the straps working slack and the collar changing form by the strain put upon it, so that the hames are liable to work loose and fall forward and off the collar.

The object of my invention is to provide an upper pad of such a form and of such material as to securely keep the collar in its proper shape, and also keep the strap that holds the hame together from pressing through the top of the collar; and, secondly, in providing the upper pad with a hook or holding-iron that will prevent the upper hame-strap from working forward, and thus keep the hames in their place on the collar.

The invention consists of a pad composed of stiff material, such as one or more thicknesses of leather of about the width of the collar, and formed so as to exactly fit over the top of the same, and to be stiff enough so that when it is held in its place by the strap that holds the top parts of the collar together it will prevent the collar from twisting or changing form; and, secondly, in providing the pad with a hook or holding-iron that will prevent the hame-strap from working forward, and thus keep the hames from coming off.

In the accompanying drawings, Figure 1 is an isometrical view of the harness-collar with pad and holding-iron embodying my invention. Fig. 2 is a side elevation of the same. Fig. 3 is a detail view of the pad and hook. Fig. 4 is a detail view of the hook or holding-iron.

In Figs. 1 and 2 are shown a common form of harness-collar, consisting of the rim R and body C, provided with the stiff top pad, P, and hook H, which are held down in place by the strap S, used to tighten the top ends of the collar together, the pad P being made about the width of the collar, and formed so as to fit closely to the top of the collar, so that by its form and stiffness it will prevent the collar from twisting or being drawn out of shape, the pad also preventing the hame-strap V from pressing in the collar and hurting the neck of the animal. The pad P is secured to the collar by means of the strap S, which is secured to one side of the collar and brought over the pad P and tightly buckled or secured to the other side of the collar, thus holding the two sides of the collar together and the pad P in its place, while the pad prevents the strap V from pressing in the collar.

In order to have the pad properly adjusted on top of the collar, it is riveted or secured to the strap S at $r\ r$, so that when the collar is to be strapped together the pad P will swing down in its place. In about the middle of pad P is riveted a hook or holding-iron, H, which, by reference to Fig. 2, will be seen secured to the pad P under the strap S, and so formed as to prevent the hame-strap V, which crosses the top and holds the hames around the collar, from working forward and off the collar.

Fig. 3 shows pad P, which can be composed of one or more thicknesses of material, and is secured to the strap S, and provided with the holding-iron H.

Fig. 4 shows a holding-iron, which is provided with rivet-holes for securing the same to the pad P, as above shown.

I do not confine myself to any particular form of iron H, the object of which being to extend up from the pad P, so as to prevent the strap that holds the hames from working forward.

It will be seen, by reference to the drawings, that the pad P is made square, or nearly so, the width and length being about equal, the corners of which are rounded, the object of forming the pad square being to present a wide surface for the hame-strap to rest upon, so that it will be prevented from working forward and off the pad, as the hame-straps get tighter as they work toward the forward edge— a fact which causes them to keep in the middle of the pad P.

What I claim as my invention is—

The solid pad P, composed of one or more thicknesses of leather without stuffing, provided with the hook H and straps S, in combination with the collar having a buckle, the said pad and hook arranged so that the former shall securely hold the collar together, and the latter keep the hames in place, substantially as set forth.

JOHN T. STOLL.

Witnesses:
PETER BOHL,
FRANK G. WATERHOUSE.